(12) United States Patent
Ohtsuki

(10) Patent No.: US 6,988,917 B2
(45) Date of Patent: Jan. 24, 2006

(54) BOAT PROPULSION SYSTEM

(76) Inventor: Kazuhiko Ohtsuki, 2-28-1, Inadera, Amagasaki-shi, Hyogo (JP)

( * ) Notice: Subject to any disclaimer, the term of this patent is extended or adjusted under 35 U.S.C. 154(b) by 0 days.

(21) Appl. No.: 10/945,439

(22) Filed: Sep. 21, 2004

(65) Prior Publication Data

US 2005/0106958 A1 May 19, 2005

(30) Foreign Application Priority Data

Sep. 22, 2003 (JP) ............................. 2003-330199

(51) Int. Cl.
*B63H 23/00* (2006.01)
(52) U.S. Cl. ................. 440/75; 440/5; 475/72
(58) Field of Classification Search ............. 440/5, 440/75, 86; 60/406, 437, 487; 92/12.2; 475/72, 74, 80, 82, 83
See application file for complete search history.

(56) References Cited

U.S. PATENT DOCUMENTS

| | | | | |
|---|---|---|---|---|
| 2,749,776 | A | * 6/1956 | Fischer et al. | 440/75 |
| 3,905,251 | A | * 9/1975 | Greene | 475/72 |
| 4,679,673 | A | * 7/1987 | Yamaoka et al. | 440/75 |
| 5,328,396 | A | 7/1994 | Hayasaka | |
| 6,099,367 | A | * 8/2000 | White et al. | 440/5 |
| 6,533,695 | B2 | * 3/2003 | Pollman et al. | 475/72 |
| 6,701,825 | B1 | * 3/2004 | Langenfeld | 92/12.2 |

FOREIGN PATENT DOCUMENTS

| | | |
|---|---|---|
| DE | 1 203 564 | 10/1965 |
| DE | 199 02 084 A1 | 8/2000 |
| EP | 0 101 358 A1 | 2/1984 |
| JP | 10-194196 | 7/1998 |

OTHER PUBLICATIONS

European Search Report for EP 04 02 2610, conducted on Apr. 7, 2005.

* cited by examiner

*Primary Examiner*—Lars A. Olson
(74) *Attorney, Agent, or Firm*—Sterne, Kessler, Goldstein & Fox, P.L.L.C.

(57) ABSTRACT

A boat propulsion system interposed between a prime mover and a propeller shaft comprises a hydro-mechanical transmission including a hydrostatic transmission part and a gear transmission part. The hydrostatic transmission part includes a variable displacement hydraulic pump having a movable swash plate and a hydraulic motor fluidly connected to the hydraulic pump. The hydraulic pump is driven by the output rotary force of the prime mover. The gear transmission part is drivingly interposed between the hydrostatic transmission part and the propeller shaft so that the gear transmission part is driven by the input rotary force of the hydraulic pump with the assistance of the output rotary force of the hydraulic motor. A hydraulic clutch system may be interposed between the gear transmission part of the hydro-mechanical transmission and the propeller shaft so as to select one of opposite output rotary directions of the propeller shaft.

13 Claims, 7 Drawing Sheets

BOAT PROPULSION SYSTEM

BACKGROUND OF THE INVENTION

1. Field of the Invention

The invention relates to a boat propulsion improved in acceleration.

2. Related Art

As disclosed in the Japanese Laid Open Gazette No. Hei 10-194196, there is a well-known conventional boat propulsion system having a pair of hydraulic clutches for forward propelling and backward propelling on its drive train between an engine and a propeller shaft.

The conventional system as disclosed in the document includes first, second and third shafts. The first shaft is coupled to a flywheel of the engine. The second shaft is disposed in parallel to the first shaft and drivingly connected to the first shaft through meshing gears fixed on the respective shafts so as to rotate opposite to the first shaft. The meshing gears between the first and second shafts do not serve as a deceleration gear, i.e., the gear ratio therebetween is 1:1. The third shaft serves as the propeller shaft. Each of the first and second shafts is provided thereon with a gear constantly meshing with a gear fixed on the third shaft. Each of the hydraulic clutches is interposed between the gear on the third shaft and the gear on each of the first and second shafts. One of the hydraulic clutches is selectively engaged to connect the corresponding gear and shaft, thereby drivingly coupling one of the first and second shafts to the third shaft, that is, propelling a boat either forward or backward.

However, the above conventional boat propulsion system has a problem. When the stationary propeller shaft is beginning acceleration, i.e., when the hydraulic clutch is engaged and the engine in idling at full-throttle, the resistance of the water against the rotating propeller fixed on the propeller shaft is transmitted to the engine through the engaging hydraulic clutch and the like, so as to prevent smooth acceleration of the engine. This is the reason why the boat equipped with the conventional propulsion system in stationary cannot be smoothly accelerated to get a desired high speed.

SUMMARY OF THE INVENTION

An object of the invention is to provide a boat propulsion system interposed between a prime mover and a propeller shaft, wherein resistance to the prime mover is lightened to smoothen acceleration of the prime mover.

To achieve the object, in a first aspect of the invention, a boat propulsion system interposed between a prime mover and a propeller shaft comprises a hydro-mechanical transmission including a hydrostatic transmission part and a gear transmission part. The hydrostatic transmission part includes a variable displacement hydraulic pump having a movable swash plate and a hydraulic motor fluidly connected to the hydraulic pump. The hydraulic pump is driven by the output rotary force of the prime mover. The gear transmission part is drivingly interposed between the hydrostatic transmission part and the propeller shaft so that the gear transmission part is driven by the input rotary force of the hydraulic pump with the assistance of the output rotary force of the hydraulic motor. Due to the assistance of the hydraulic motor, the resistance to the prime mover is lightened while a sufficient deceleration ratio of the hydro-mechanical transmission for driving the propeller shaft is ensured.

Preferably, in the first aspect of the invention, the boat propulsion system further comprises a reverser interposed between the gear transmission part of the hydro-mechanical transmission and the propeller shaft so as to select one of opposite output rotary directions of the propeller shaft. Therefore, the boat can be propelled forward and backward.

Preferably, the gear transmission part includes a planetary gear which combines the input rotary force of the hydraulic pump and the output rotary force of the hydraulic motor, and transmits the resultant rotary force to the propeller shaft. Such a simple and compact planetary gear can transmit the assistant force of the hydraulic motor to the gear transmission part.

Preferably, the swash plate of the hydraulic pump being movable into one of first and second opposite ranges from a neutral position, and the gear transmission part having a proper deceleration ratio established by stopping the hydraulic motor, wherein, if the output rotary speed of the prime mover is lower than a predetermined speed, the swash plate of the hydraulic pump is disposed in the first range to rotate the hydraulic motor so that a deceleration ratio of the hydro-mechanical transmission becomes larger than the proper deceleration ratio of the gear transmission part. Therefore, the acceleration of the prime mover from its idling speed to the predetermined speed is smoothened.

Further preferably, the swash plate of the hydraulic pump in the first range is moved to reduce the displacement of the hydraulic pump as the output rotary speed of the prime mover is increased. Therefore, the increased deceleration ratio of the hydro-mechanical transmission is appropriately reduced as far as the prime mover is accelerated.

Further preferably, if the rotary speed of the prime mover is substantially equal to the predetermined speed, the swash plate of the hydraulic pump is set at the neutral position to stop the hydraulic motor so as to realize the proper deceleration ratio of the gear transmission part. The proper deceleration ratio is so established that the boat can be propelled while ensuring optimum drive of the prime mover.

Further preferably, if the output rotary speed of the prime mover is higher than the predetermined speed, the swash plate of the hydraulic pump is disposed in the second range to rotate the hydraulic motor so that the deceleration ratio of the hydro-mechanism transmission becomes smaller than the proper deceleration ratio of the gear transmission part. Therefore, the boat can be appropriately propelled at such a high speed as to cause overdrive of the prime mover.

Further preferably, the swash plate of the hydraulic pump in the second range is moved to increase the displacement of the hydraulic pump as the output rotary speed of the prime mover above the predetermined speed is increased. Therefore, the deceleration ratio of the hydro-mechanical transmission is appropriately increased from the proper deceleration ratio of the gear transmission part as far as the propeller shaft is accelerated.

To achieve the object, in a second aspect of the invention, a boat propulsion system interposed between a prime mover and a propeller shaft comprises a hydro-mechanical transmission including a hydrostatic transmission part and a gear transmission part. The hydrostatic transmission part includes a variable displacement hydraulic pump having a movable swash plate and a hydraulic motor fluidly connected to the hydraulic pump and drivingly connected to the propeller shaft. The gear transmission part is drivingly interposed between the prime mover and the hydrostatic transmission part so that the gear transmission part is driven by the output rotary force of the prime mover so as to rotate the hydraulic pump with the assistance of the output rotary force of the hydraulic motor.

Preferably, the gear transmission part includes a planetary gear which combines the output rotary force of the prime mover and the output rotary force of the hydraulic motor, and transmits the resultant force to the hydraulic pump.

Preferably, the swash plate of the hydraulic pump is movable into one of first and second opposite ranges from a neutral position. The swash plate of the hydraulic pump is set in the first range to rotate the propeller shaft for forward propelling, and set in the second range to rotate the propeller shaft for backward propelling. Therefore, the boat propulsion system requiring no reverser for selecting the propelling direction of the boat can be compacted and reduced in costs.

Preferably, the hydraulic motor includes a movable swash plate which is moved to reduce the displacement of the hydraulic motor when the swash plate of the hydraulic pump reaches a limit position of either the first or second range away from the neutral position.

In a third aspect of the present invention, a boat propulsion system interposed between a prime mover and a propeller comprises: a planetary gearing mechanism having first, second and third elements; and a hydrostatic transmission having an input portion and an output portion. The prime mover is drivingly connected to the first element. The propeller shaft is drivingly connected to the second element. One of the input and output portions of the hydrostatic transmission is drivingly connected to the third element, and the other to either the first or second element.

These, further and other objects, features and advantages will appear more fully from the following detailed description with reference to accompanying drawings.

DETAILED DESCRIPTION OF THE INVENTION

Figure 1:
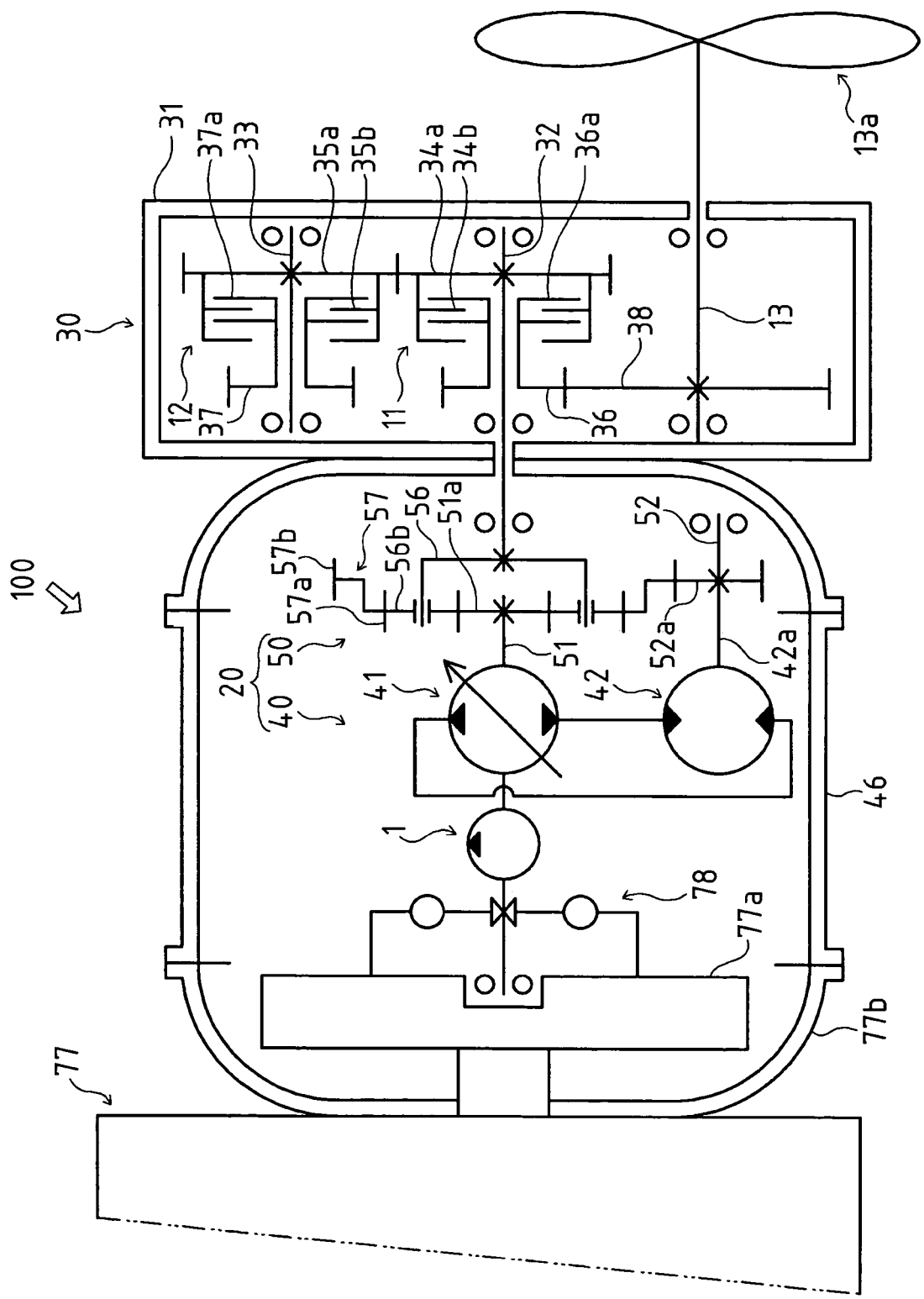
FIG. 1 is a diagram of a boat propulsion system according to a first embodiment of the present invention.

As shown in FIG. 1, a boat propulsion system 100 and a hydraulic clutch system 30 are interposed in tandem between an engine 77 and a propeller shaft 13 on which a propeller 13a is fixed.

Boat propulsion system 100, according to a first embodiment of the invention, comprises a hydro-mechanical transmission (HMT) 20 including a hydrostatic transmission part (HST) part 40 and a gear transmission part 50. HST part 40 includes a hydraulic pump 41 driven by engine 77, and a hydraulic motor 42 fluidly connected to hydraulic pump 41. HMT 20 is constructed as an output-dividing type, wherein gear transmission part 50 is driven by engine 77 (by the input rotary force of HST part 40) with the assistance of hydraulic motor 42 (of the output rotary force of HST part 40). Gear transmission part 50 includes a later-discussed planetary gear (gears) which combine the input rotary force of hydraulic pump 41 (the output rotary force of engine 77) and the output rotary force of hydraulic motor 42 so as to transmit the resultant force to hydraulic clutch system 30.

Hydraulic clutch system 30 includes a hydraulic forward propelling clutch 11 and a hydraulic backward propelling clutch 12. Either clutch 11 or 12 is selectively engaged with propeller shaft 13 so as to drive propeller shaft 13.

A hydraulic circuit of boat propulsion system 100 shown in FIG. 2 will be described.

A charge pump 1 for distributing oil between hydraulic clutch system 30 and HST part 40 is driven by engine 77 so as to suck oil from an oil tank 2. Charge pump 1 delivers oil to a directive control valve 7 for hydraulic clutch system 30 through a passage 3, a flow regulating valve 4 and passages 5 and 6.

Passage 5 in which the quantity of oil is regulated by flow regulating valve 4 bifurcates into passage 6 to directive control valve 7 and a passage to a pressure regulating valve 8 so that pressure regulating valve 8 regulates the pressure of oil in passage 6.

A lube passage 9 is extended from pressure regulating valve 8 through a water cooling type oil cooler 14 so as to supply lube oil to clutches 11 and 12. A pressure regulating valve 10 is provided for regulating the pressure of oil in passage 9.

Directive control valve 7 is shiftable among a neutral position N, a forward propelling clutch position F and a backward propelling clutch position B. Clutch positions F and B are opposite to each other with respect to neutral position N. On a boat, a clutch lever 70 is provided with a neutral position N, a forward propelling position F and a backward propelling position B corresponding to the respective three positions N, F and B of directive control valve 7. Clutch lever 70 is operatively connected to directive control valve 7 so that valve 7 is selectively set at one of the three positions N, F and B in correspondence to where lever 70 is selectively set among its shift positions N, F and B.

The operative connection between lever 70 and valve 7 may be made by a mechanical linkage. However, lever 70 is provided with a detector for inputting a positional signal of lever 70 to a later-discussed controller 26. Therefore, alternatively, valve 7 may be electrically controlled due to the signal from the detector of lever 70.

Passage 6 bifurcates into inlet ports 71a and 71b of directive control valve 7. Further, directive control valve 7 has a drain port 72 in parallel to inlet ports 71a and 71b, which is extended to oil tank 2.

Directive control valve 7 has ports 73, 74 and 75. Forward propelling clutch port 73 communicates with a hydraulic oil chamber of forward propelling clutch 11, and backward propelling clutch port 74 with a hydraulic oil chamber of backward propelling clutch 12. Pressure regulating port 75 is connected to a backpressure chamber 82 of pressure regulating valve 8 for clutches 11 and 12 through an oil passage 15.

By setting clutch lever 70 at its neutral position N, directive control valve 7 is set at its neutral position N where all ports 73, 74 and 75 are connected to drain port 72 so as to drain oil to oil tank 2 from all the hydraulic oil chambers of clutches 11 and 12 and backpressure chamber 82 of pressure regulating valve 8.

By setting clutch lever 70 at either its forward propelling position F or backward propelling position B, directive control valve 7 is set at the corresponding one of its forward propelling clutch position F and backward propelling clutch position B, where the corresponding one of clutch ports 73 and 74 is connected to inlet port 71b, and the other port 74 or 73 to drain port 72, so that the corresponding one of clutches 11 and 12 is engaged and the other clutch 12 or 11 is disengaged.

Further, when directive control valve 7 is set at one of forward propelling clutch position F and backward clutch propelling position B, pressure regulating port 75 is connected to inlet port 71a through an orifice 76a (at forward propelling clutch position F) or 76b (at backward propelling clutch position B) so as to gradually fill backpressure chamber 82 with oil pushing a piston 81 against a spring 80. Pressure regulating valve 8 is a modulated relief valve, which is opened by the force of spring 80 when backpressure chamber 82 is empty, and gradually closed as oil in backpressure chamber 82 supplied from directive control valve 7 is increased. Due to this action of pressure regulating valve 8, the hydraulic oil chamber of clutch 11 or 12 going to be engaged is gradually filled with oil from charge pump 1 through directive control valve 7, thereby preventing the shock of engaged clutch 11 or 12. After backpressure chamber 82 is full of oil, excessive oil from passage 5 enters a pilot passage 5a so as to open valve 8 against the force of spring 80 and the pressure of oil in backpressure chamber 82, thereby keeping the proper oil pressure engaging clutch 11 or 12.

Concerning HST part 40, excessive oil from flow regulating valve 4 is supplied through a passage 21 to HST part 40 so as to serve as hydraulic oil for HST part 40.

On the other hand, oil regulated by flow regulating valve 4 is supplied to a swash plate control valve 23 through a passage 22. A servo actuator 24 is a double-acting hydraulic cylinder whose piston rod 24a is connected to a swash plate control arm 25 interlocking with a movable swash plate 41f (see FIG. 3) of hydraulic pump 41 in HST part 40. Servo-actuator 24 has two oil chambers fluidly connected to swash plate control valve 23. The two oil chambers of servo-actuator 24 are opposite to each other with respect to a piston on piston rod 24a. Swash plate control valve 23 is also fluidly connected to oil tank 2.

Swash plate control valve 23 is an electromagnetic solenoid valve which is shifted among three positions L, C and R due to the output signal from a controller 26. When valve 23 is set at center position C, both the oil chambers of servo-actuator 24 are isolated from passage 22 and oil tank 2 so as to stop piston rod 24a, thereby stopping swash plate control arm 25 and swash plate 41f. In FIG. 2, when valve 23 is set at position L, the left chamber of servo-actuator 24 is supplied with oil and oil is drained from the right chamber of servo-actuator 24 so as to move piston rod 24a rightward, thereby rotating arm 25 clockwise for moving swash plate 41f in one direction. In FIG. 2, when valve 23 is set at position R, the right chamber of servo-actuator 24 is supplied with oil and oil is drained from the left chamber of servo-actuator 24 so as to move piston rod 24a leftward, thereby rotating arm 25 counterclockwise for moving swash plate 41f in the other direction.

Controller 26 is electrically connected to an engine speed sensor 27a, a thermometer 27b and a boost pressure sensor 27c. Engine speed sensor 27a detects the output rotary speed of engine 77, i.e., the rotary speed of a pump shaft 41a of hydraulic pump 41. Thermometer 27b is a sensor detecting the temperature of gas exhausted from engine 77. Boost pressure sensor 27c detects the boost pressure in a supercharger of engine 77. A program is programmed in controller 26 so as to control the position of swash plate control valve 23 due to the detection signals from sensors 27a, 27b and 27c.

An accelerator lever 28 is provided on the boat and electrically connected to controller 26. When accelerator lever 28 is set at an idling position IDL, controller 26 keeps an idling speed of engine 77 in constant. When accelerator lever 28 is set at a full-throttle position FS, controller 26 keeps a rated speed of engine 77 in constant.

Accelerator lever 28 is provided with a potentiometer. The program in controller 26 for controlling swash plate control valve 23 is also associated with the signals from the potentiometers of accelerator lever 28 and clutch lever 70. This will be discussed later.

A mechanism of hydraulic clutch system 30 will now be described. As shown in FIG. 1, hydraulic clutch system 30 comprises a clutch casing 31 in which a clutch input shaft 32 is journalled so as to be rotated by the output rotary force of HMT 20. More specifically, a front end of clutch input shaft 32 is extended forward and fixed to a carrier 56 of gear transmission part 50. Propeller shaft 13 is journalled in clutch casing 31 and projects rearward from clutch casing 31 so as to be fixed provided thereon with propeller 13a. A counter shaft 33 is journalled in parallel to clutch input shaft 32 in clutch casing 31.

A clutch input gear 34a fixed on clutch input shaft 32 and a clutch input gear 35a fixed on counter shaft 33 constantly mesh with each other. A clutch output gear 36 is freely rotatably provided on clutch input shaft 32, and a clutch output gear 37 on counter shaft 33. A final gear 38 fixed on propeller shaft 13 constantly meshes with both gears 36 and 37.

Forward propelling clutch 11 is interposed on clutch input shaft 32 between gears 34a and 36, and backward propelling clutch 12 on counter shaft 33 between gears 35a and 37. Clutches 11 and 12, gears 34a, 35a, 36 and 37, and shafts 32 and 33 constitute an assembly referred to as a "reverser". Forward propelling clutch 11 includes a clutch disk (clutch disks) 34b constantly fitted to gear 34a and a clutch disk (clutch disks) 36a constantly fitted to gear 36. Backward propelling clutch 12 includes a clutch disk (clutch disks) 35b constantly fitted to gear 35a and a clutch disk (clutch disks) 37a constantly fitted to gear 37.

When clutch lever 70 is set at its forward propelling position F, directive control valve 7 is set at its forward propelling clutch position F so as to supply hydraulic oil into the hydraulic oil chamber of forward propelling clutch 11, whereby clutch disks 34b and 36a fit each other, i.e., forward propelling clutch 11 is engaged. Meanwhile, oil is drained from the hydraulic oil chamber of backward propelling clutch 12 so that clutch disks 35b and 37a are separated from each other, i.e., backward propelling clutch 12 is disengaged. Therefore, the rotary force of clutch input shaft 32 is transmitted to propeller shaft 13 through gears 34a, 36 and 38, thereby rotating propeller shaft 13 in the direction for forward propelling.

When clutch lever 70 is set at its backward propelling position B, directive control valve 7 is set at its backward propelling clutch position B so as to supply hydraulic oil into the hydraulic oil chamber of backward propelling clutch 12, whereby clutch disks 35b and 37a fit each other, i.e., backward propelling clutch 12 is engaged. Meanwhile, oil is drained from the hydraulic oil chamber of forward propelling clutch 11 so that clutch disks 34b and 36a are separated from each other, i.e., forward propelling clutch 11 is disengaged. Therefore, the rotary force of clutch input shaft 32 is transmitted to propeller shaft 13 through gears 34a, 35a, 37 and 38, thereby rotating propeller shaft 13 in the other direction for backward propelling.

A mechanism of HMT 20 will now be described with reference to FIGS. 1 to 3. HMT 20 is incorporated in a transmission casing 46 interposed between engine 77 and clutch casing 31. An engine casing 79 incorporating engine 77 is fixedly provided at the rear end thereof with a flywheel housing 77b incorporating a flywheel 77a fixed on the rear end of the output shaft of engine 77. Flywheel housing 77b is open rearward, and an open front end of transmission casing 46 is fastened to the open rear end of flywheel housing 77b. Transmission casing 46 has a rear end surface which is closed excluding the portion penetrated by clutch input shaft 32 of hydraulic clutch system 30. The rear end surface of transmission casing 46 is fixedly fitted to a front end surface of clutch casing 31.

Transmission casing 46 is integrally formed therein with a gear transmission housing portion 46a extended forward from the rear end wall of transmission casing 46 and upward from the bottom wall of transmission casing 46 so as to enclose gear transmission part 50. In transmission casing 46, a vertical plate-like center section 45 is fastened through bolts 47a to a front open end of gear transmission housing portion 46a so as to partition HST part 40 from gear transmission part 50 therebehind. To constitute HST part 40, a forwardly recessed HST housing 48 is fixed at an open rear end thereof to a front end surface of center section 45, and a cylinder block 41b of hydraulic pump 41 and a cylinder block 42b of hydraulic motor 42 are vertically aligned in HST housing 48 and slidably rotatably mounted on the front surface of center section 45. A closed oil circuit is formed in center section 45 so as to mutually fluidly connect cylinder blocks 41b and 42b mounted on center section 45.

Hydraulic pump 41 has axial pump shaft 41a not-relatively engaging with cylinder block 41b. Pump shaft 41a is disposed coaxially to the output shaft of engine 77 (the center line of flywheel 77a). Pump shaft 41a is extended forward and connected at the front end thereof to flywheel 77a through a damper 78. Pump shaft 41a is extended rearward to rotatably penetrate center section 45, and the rear end of pump shaft 41a is spline-fitted into a front-end splined recess 51b of a coaxial input shaft 51 of gear transmission part 50 behind center section 45.

Hydraulic motor 42 has an axial motor shaft 42a not-relatively engaging with cylinder block 42b. Motor shaft 42a is disposed in parallel to pump shaft 41a thereabove. A front end of motor shaft 42a is journalled by a front end wall of HST housing 48 through a bearing. Motor shaft 42a is extended rearward to rotatably penetrate center section 45, and the rear end of moor shaft 42a is spline-fitted into a front-end splined recess 52b of a coaxial motor extension shaft 52 of gear transmission part 50 behind center section 45.

A spring 41c is wounded around pump shaft 41a in cylinder block 41b, and a spring 42c around motor shaft 42a in cylinder block 42b, so as to press cylinder blocks 41b and 42b against the front surface of center section 45.

Pistons 41e are reciprocally slidably fitted into cylinder block 41b around pump shaft 41a, and pistons 42e into cylinder block 42b around motor shaft 42a. A movable swash plate 41f is disposed between cylinder block 41b and the front end wall of HST housing 48 so as to abut against heads of pistons 41e. A fixed swash plate 42f is disposed between cylinder block 42b and the front end wall of HST housing 48 so as to abut against heads of pistons 42e. Pump shaft 41a and motor shaft 42a freely penetrate respective swash plates 41f and 42f.

Charge pump 1 is compactly constructed on pump shaft 41a between the front end of HST housing 48 and flywheel 77a. A charge pump casing 48b is fixed to the front end of HST housing 48 around pump shaft 41a. Charge pump 1 is a gear pump including an inner gear 1a and an outer gear 1b. Inner gear 1a is fixed on pump shaft 41a, and outer gear 1b is supported around inner gear 1a by surrounding charge pump casing 48a. A charge pump cover plate 48b is fixed to the front end of charge pump casing 48a so as to cover the front end of gears 1a and 1b constituting charge pump 1 while allowing rotatable penetration of pump shaft 41a therethrough. In this way, charge pump 1 is compactly constructed integrally with HST part 40 and efficiently driven by use of pump shaft 41a of hydraulic pump 41.

The rear surface of center section 45, the rear and bottom walls of transmission casing 46, and gear transmission housing portion 46a enclose a space 50a for incorporating gear transmission part 50.

A bearing wall 46b having bearings 59a and 59b therein is fastened to transmission casing 46 by a bolt (bolts) 47b. Input shaft 51 is journalled by bearing 59a, and motor extension shaft 52 by bearing 59b, so as to be fixed (spline-fitted) to respective pump shaft 41a and motor shaft 42a. Clutch input shaft 32 serving as the output shaft of gear transmission part 50 is disposed coaxially to input shaft 51 through the rear wall of transmission casing 46 behind input shaft 51. A central boss portion 56c of carrier 56 is fixed on the front end of clutch input shaft 32 and journalled by the rear wall of transmission casing 46 through a bearing 59c. The rear end of motor extension shaft 52 is journalled by the rear wall of transmission casing 46 through a bearing 59e.

A sun gear 51a is peripherally formed on input shaft 51 behind bearing 59a. Input shaft 51 (sun gear 51a) is journalled at the rear end thereof by carrier 56 through a bearing. A pivot pin 56a is (or pivot pins 56a are) mounted on carrier 56 and disposed in parallel to input shaft 51. A planetary gear 56b is pivoted on pivot pin 56a (or planetary gears 56b are pivoted on respective pivot pins 56a) and meshes (or mesh) with sun gear 51a. An assist gear member 57 is relatively rotatably supported on carrier 56 through a bearing 59d. An internal gear 57a is formed on the inner periphery of assist gear member 57 and meshes with planetary gear (or all planetary gears) 56b.

Motor extension shaft 52 is integrally formed with a gear 52a adjacent to the rear wall of transmission casing 46. An external gear 57b is formed on the outer periphery of assist gear member 57 and meshes with gear 52a of motor extension shaft 52.

If swash plate 41f of hydraulic pump 41 is set at the neutral position, motor shaft 42a, and assist gear member 57 interlocking with it, are stationary. According to the rotation of pump shaft 41a, planetary gear (or gears) 56b revolves (revolve) around sun gear 51a so as to rotate clutch input shaft 32 with carrier 56. The deceleration ratio of HMT 20 is defined as the rotation speed of input shaft 51 relative to the revolution speed of carrier 59c. The proper deceleration ratio of gear transmission part 50 is defined as the deceleration ratio of HMT 20 when motor shaft 42a (with motor extension shaft 52) is stationary, and it is determined by the teeth count ratio between planetary gear 56b and sun gear 51a.

If movable swash plate 41f of hydraulic pump 41 is slanted to rotate hydraulic motor 42, the rotary force of assist gear member 57 rotated by motor shaft 42a and motor extension shaft 52 is applied to planetary gear 56b revolving around sun gear 51c, thereby accelerating or decelerating carrier 56. When movable swash plate 41f is slanted into one range (a first range) from the neutral position, motor 42a rotates in the opposite direction to pump shaft 41a so as to decelerate carrier 56, thereby increasing the deceleration ratio of HMT 20 to a level above the proper deceleration ratio of gear transmission part 50. When movable swash plate 41f is slanted to the other range (a second range opposite to the first range) from the neutral position, motor shaft 42a rotates in the same direction with pump shaft 41a so as to accelerate carrier 56, thereby reducing the deceleration ratio of HMT 20 to a level below the proper deceleration ratio of gear transmission part 50.

When idling engine 77 is going to be accelerated, movable swash plate 41f is slanted into the first range so as to increase the deceleration ratio of HMT 20 to a level above the proper deceleration ratio of gear transmission part 50, whereby engine load is reduced so that engine 77 can be accelerated smoothly. If the rotary speed of engine 77 reaches a predetermined value, movable swash plate 41f is set at the neutral position so as to stop motor shaft 42a and realize the proper deceleration ratio of gear transmission part 50 as the deceleration ratio of HMT 20, thereby efficiently transmitting power of engine 77 to clutch input shaft 32 through gear transmission part 50. If propeller shaft 13 must be rotated at such a high speed as that of overdriving engine 77, movable swash plate 41f is slanted into the second range so as to reduce the deceleration ratio of HMT 20 to a level below the proper deceleration ratio of gear transmission part 50, thereby appropriately accelerating propeller shaft 13.

Movable swash plate 41f is servo-controlled in this way by executing the program programmed in controller 26.

Figure 4:
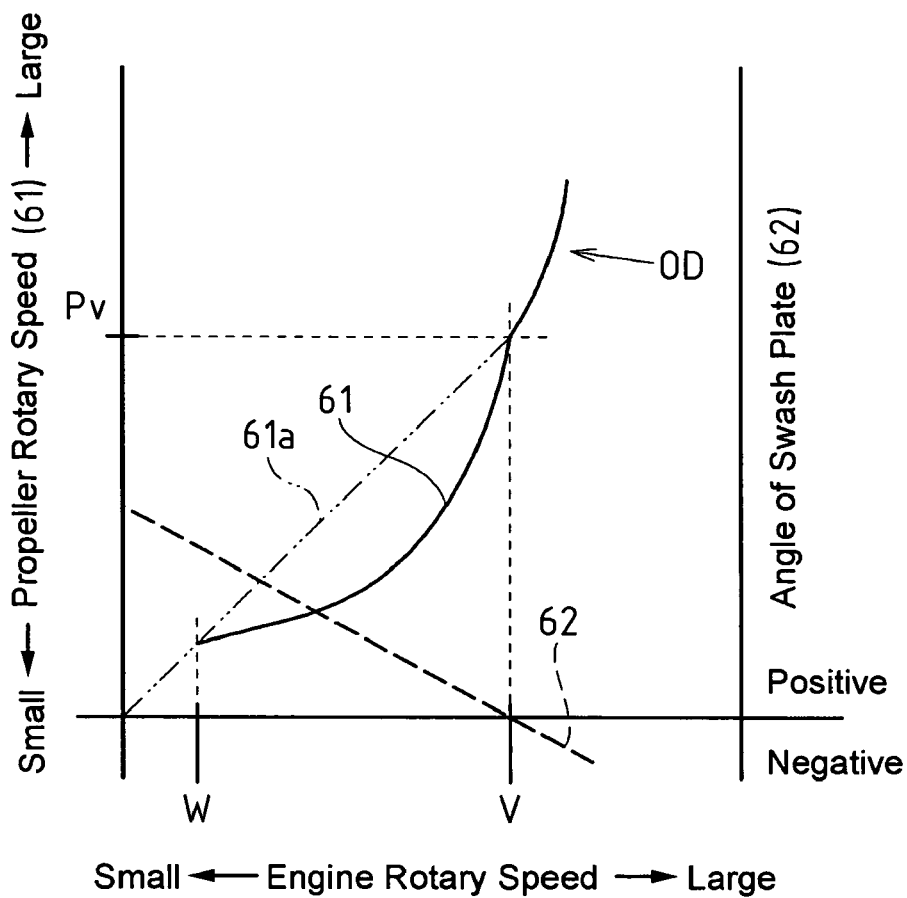
FIG. 4 is a graph of the rotary speed of a propeller shaft in relation to an engine speed and a pump swash plate angle when using the boat propulsion system according to the first embodiment.

In this regard, referring to FIG. 4, a predetermined rotary speed V of engine 77 (rated engine speed V) is established in the program so as to rotate propeller shaft 13 (propeller 13a) at an optimum speed Pv for realizing a sufficient propelling force of the boat. If engine 77 is provided with a supercharger, rated engine speed V must be established to ensure the start of the supercharger with sufficient boost pressure. In other words, rated engine speed V is set for ensuring the optimal driving of engine 77 in efficiency of energy (fuel) consumption.

When the rotary speed of engine 77 is below rated engine speed V, swash plate control valve 23 is operated to shift movable swash plate 41f in the first range so that motor shaft 42a rotates to decelerate planetary gear (gears) 56b and carrier 56 and to make the deceleration ratio of HMT 20 larger than the proper deceleration ratio of gear transmission part 50. Corresponding to the zeroed engine speed, movable swash plate 41f is slanted to the maximum angle in the first range so as to realize the maximum rotary speed of motor shaft 42a and the maximum deceleration ratio of HMT 20. Corresponding to rated engine speed V, movable swash plate 41f is set at the neutral position so as to stop motor shaft 42a and realize the proper deceleration ratio of gear transmission part 50 as the deceleration ratio of HMT 20. As the rotary speed of engine 77 is increased from zero up to rated engine speed V, by rotating acceleration lever 28, the angle of movable swash plate 41f is reduced from the maximum angle in the first range to zero corresponding to the neutral position as being expressed by a dotted straight-line graph 62 in FIG. 4.

Controller 26 controls swash plate control valve 23 for shifting movable swash plate 41f based on the detection of the rotary speed of engine 77 by engine speed sensor 27a. Alternatively, it may be based on the detection of the boost pressure in the supercharger of engine 77 by boost pressure sensor 27c. In this case, a predetermined boost pressure replaces rated engine speed V.

Due to the program in controller 26, while accelerator lever 28 is rotated from idling position IDL (or a trolling position TR) to full-throttle position FS, so as to increase the rotary speed of engine 77 from an idling speed (or trolling speed) W up to rated engine speed V, as being expressed by a curved-line graph 61 in FIG. 4, the rotary speed of propeller shaft 13 is gradually increased at the beginning of acceleration of engine 77 (the rotation of accelerator lever 28 adjacent to idling position IDL or trolling position TR), and it is steeply increased at the end of acceleration of engine 77 (the rotation of accelerator lever 28 adjacent to full-throttle position FS).

Figure 5:
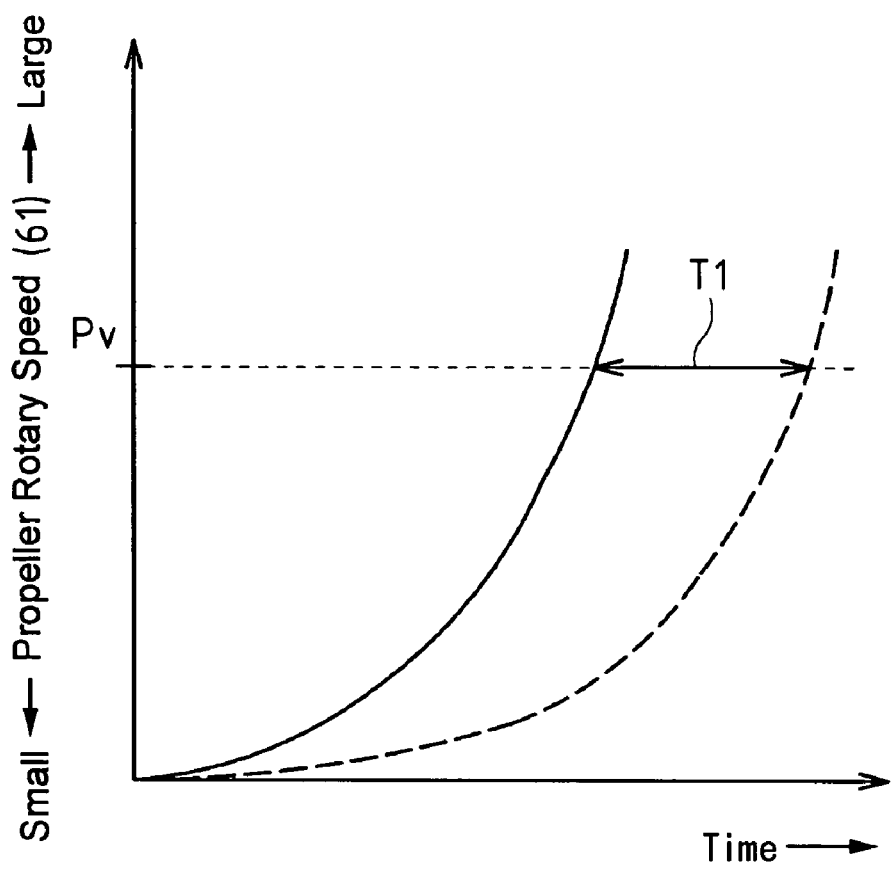
FIG. 5 is a time chart of the rotary speed of the propeller shaft showing the effect of the present boat propulsion system compared to the conventional system.

In this way, the efficiency of acceleration of propeller shaft 13 is optimized. In FIG. 5, a solid graph expresses acceleration of propeller shaft 13 by gear transmission part 50 with the assistance of hydraulic motor 42 according to the program, and a dotted graph expresses acceleration of propeller shaft 13 by gear transmission part 50 without the assistance of hydraulic motor 42. From the comparison of the two graphs, it is understood that propeller shaft 13 is accelerated swiftly, i.e., the time for acceleration of propeller shaft 13 by the increased deceleration ratio of HMT 20 (with the assistance of hydraulic motor 42) is reduced by a time T1 in comparison with that by the proper deceleration ratio of gear transmission part 50.

If propeller shaft 13 is required to rotate at such a high speed as to make the rotary speed of engine 77 exceed rated engine speed V, i.e., if engine 77 must overdrive, accelerator lever 28 is rotated in an overdrive range between full-throttle position FS and an overdrive limit position OD. Correspondingly, movable swash plate 41f is slanted into the second range opposite to the first range with respect to the neutral position, thereby rotating motor shaft 42a so as to accelerate planetary gear (gears) 56b and carrier 56.

As being expressed by dotted straight-line graph 62 in FIG. 4, as the rotary speed of engine 77 is increased from rated engine speed V by rotating acceleration lever 28, the angle of movable swash plate 41f is changed from zero corresponding to the neutral position to a (negative) value in the second range.

Due to the program in controller 26, while accelerator lever 28 is rotated from full-throttle position FS to overdrive limit position OD, so as to increase the rotary speed of engine 77 from rated engine speed V, as being expressed by curved-line graph 61 in FIG. 4, the rotary speed of propeller shaft 13 is increased.

Figure 2:
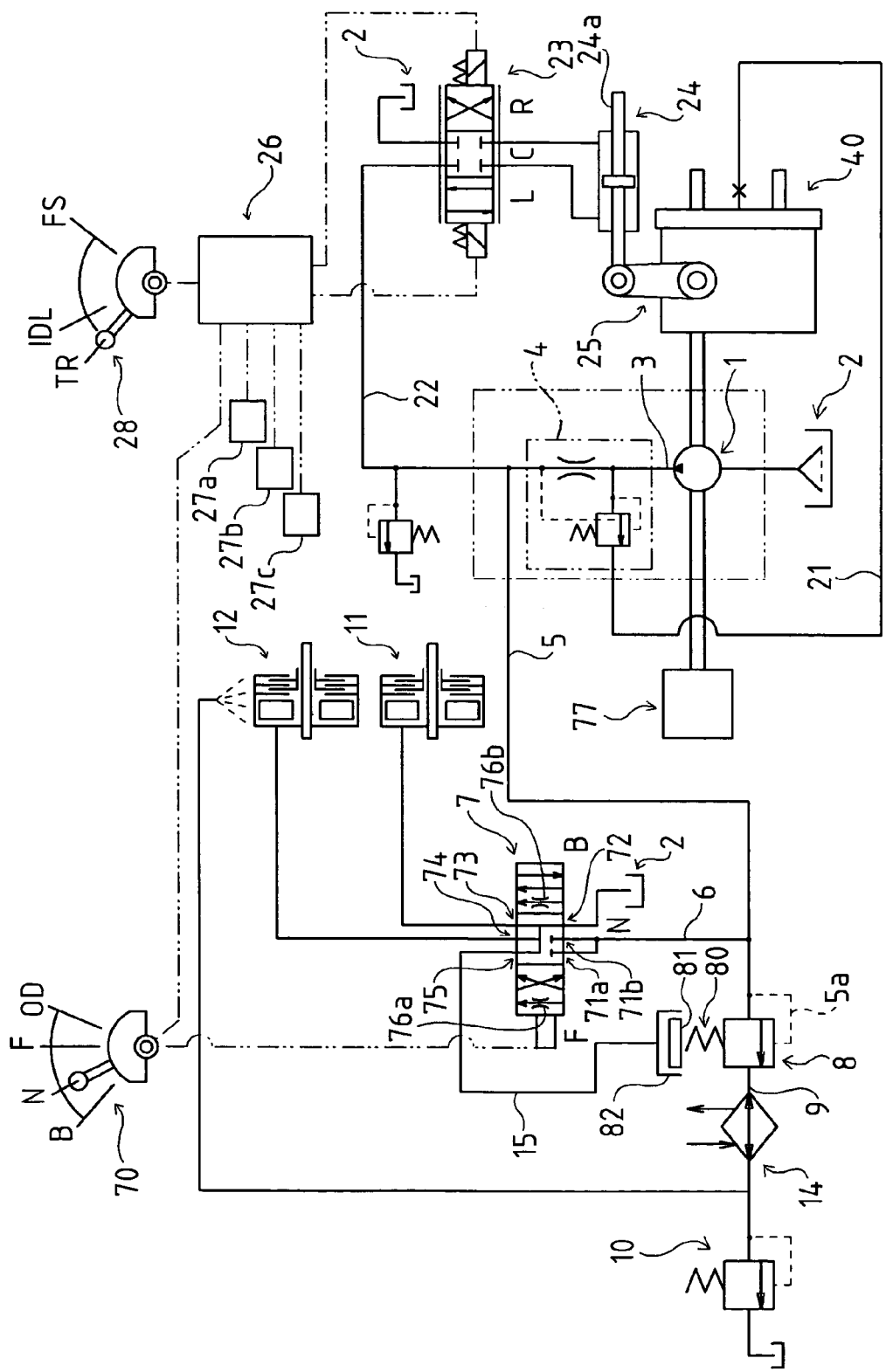
FIG. 2 is a hydraulic circuit diagram of the boat propulsion system.
Figure 3:
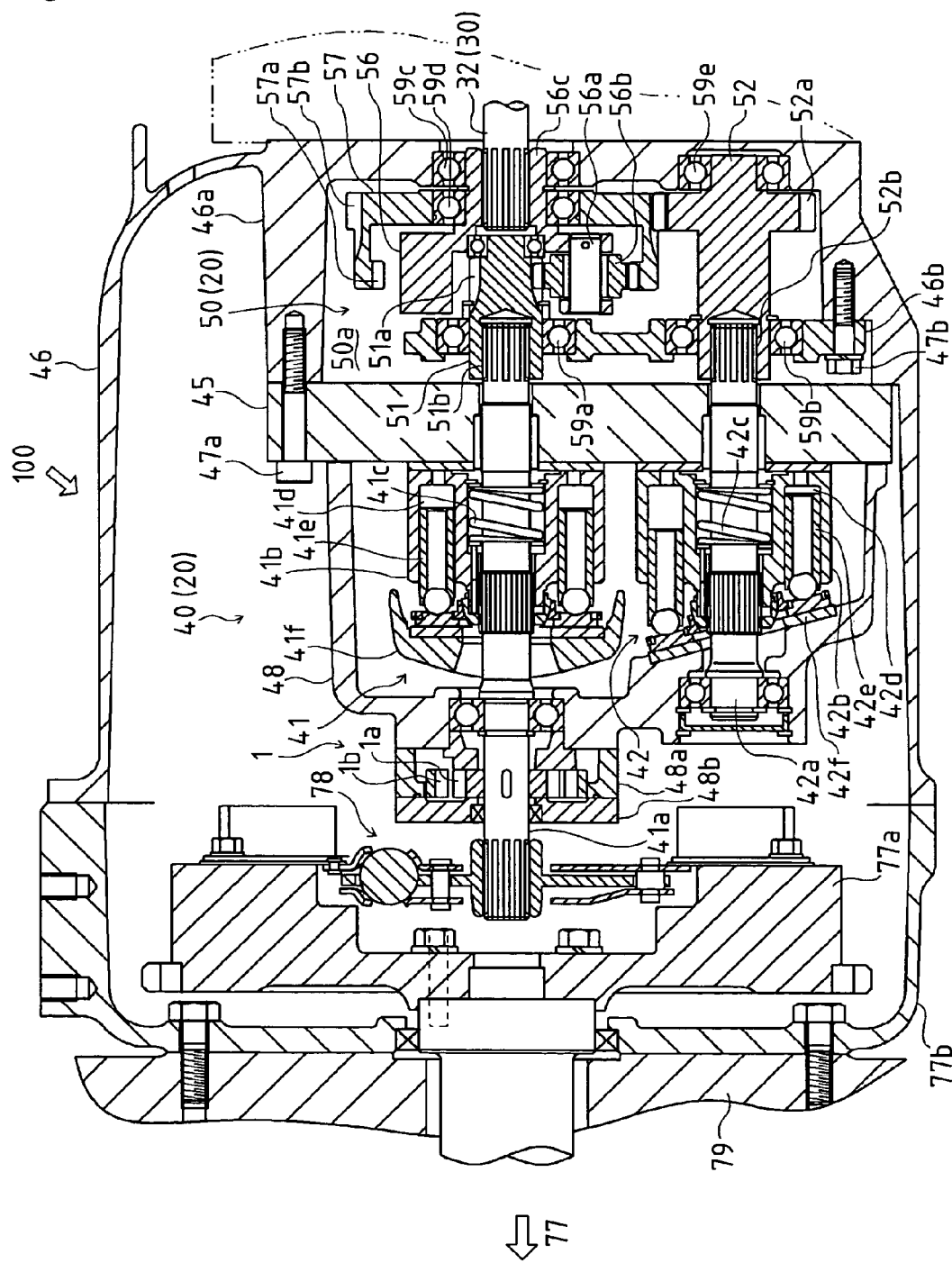
FIG. 3 is a sectional side view of the boat propulsion system.

As shown in FIG. 2, concerning the shift positions of accelerator lever 28, trolling position TR is set opposite to full-throttle position FS with respect to idling position IDL. By shifting accelerator lever 28 from idling position IDL to trolling position TR, idling engine speed W is kept but the slant angle of movable swash plate 41f is changed to rotate propeller shaft 13 at a trolling speed.

Figure 6:
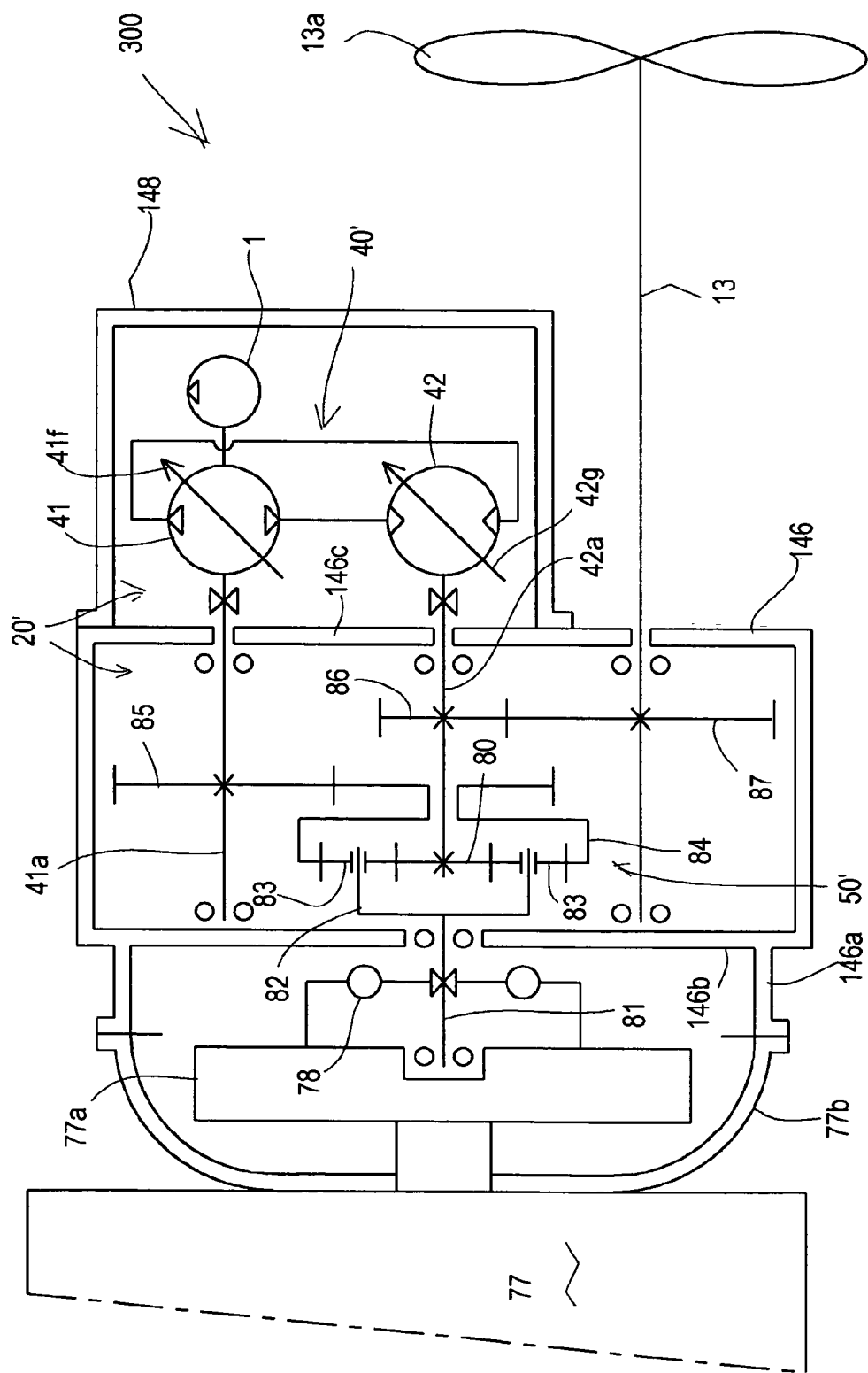
FIG. 6 is a diagram of a boat propulsion system according to a second embodiment of the present invention.

A boat propulsion system 300 shown in FIG. 6 according to a second embodiment of the invention will be described. Boat propulsion system 300 interposed between engine 77 and propeller shaft 13 includes a gear transmission casing 146 and an HST casing 148. Gear transmission casing 146 has a rear end wall 146c from which propeller shaft 13 projects rearward. HST casing 148 is attached at its front end to rear end wall 146c of gear transmission casing 146, so as to be overhung rearward from gear transmission casing 146 above the portion of propeller shaft 13 projecting rearward from gear transmission casing 146. Alternatively, HST casing 148 may be replaced with a part of gear transmission casing 146.

Gear transmission casing 146 has a front wall 146b from which a forwardly open front portion 146a projects forward to be connected to the rear open end of flywheel housing 77b so as to enclose flywheel 77a of engine 77. In gear transmission casing 146, propeller shaft 13 is journalled at a front end thereof by front wall 146b, and journalled at an intermediate portion thereof by rear end wall 146c.

Boat propulsion system 300 comprises an HMT 20' including a gear transmission part 50' in gear transmission casing 146 and an HST part 40' in HST casing 148.

HST part 40' comprises mutually fluidly connected hydraulic pump 41 and motor 42. Pump shaft 41a of hydraulic pump 41 and motor shaft 42a of hydraulic motor 42 rotatably penetrate rear end wall 146c of gear transmission casing 146 so as to extend forward in gear transmission casing 146. The front end of pump shaft 41a is journalled by front wall 146b of gear transmission casing 146 through a bearing. The extended portions of pump shaft 41a and motor shaft 42a in gear transmission casing 146 may be members separated from pump shaft 41a and motor shaft 42a but coaxially fixed to them. Incidentally, pump shaft 41a is also used as the drive shaft of charge pump 1.

Gear transmission part 50' is provided with a planetary gearing assembly including a sun gear 80, a carrier 82, a planetary gear (planetary gears) 83, and an assist gear 84. A central shaft 81 of carrier 82 is journalled by front wall 146b of gear casing 146 and projects forward into front end portion 146a so as to be connected to flywheel 77a through damper 78, thereby serving as an input shaft of HMT 20'.

Carrier 82 pivotally supports planetary gear (or gears) 83. Sun gear 80 is fixed on the front end of motor shaft 42a and meshes with planetary gear (gears) 83. Assist gear 84 is freely rotatably provided on motor shaft 42a. Assist gear 84 has an internal gear meshing with planetary gear (gears) 83, and also has an external gear meshing with a gear 85 fixed on pump shaft 41a.

In gear transmission casing 146, a gear 86 fixed on motor shaft 42a and a final gear 87 fixed on propeller shaft 13 mesh with each other so as to constitute a deceleration gear train.

Due to the above construction, planetary gear 83 distributes (planetary gears 83 distribute) the rotary force of carrier 82 serving as the input force of HMT 20' between assist gear 84 and sun gear 80. Motor shaft 42a is driven by hydraulic motor 42 with the assistance of the distributed rotary force of carrier 82 through planetary gear (gears) 83 and sun gear 80 so as to drive propeller shaft 13. Hydraulic pump 41 is driven by the distributed rotary force of carrier 82 through planetary gear (gears) 83 and assist gear 84 so as to drive hydraulic motor 42. The output rotary force of hydraulic motor 42 assists the input rotary force of hydraulic pump 41 through sun gear 80, planetary gear (gears) 83 and assist gear 84.

The rotary direction of propeller shaft 13, i.e., the output rotary direction of HMT 20' depends upon the rotary direction of motor shaft 42a, i.e., whether movable swash plate 41f of hydraulic pump 41 is shifted in opposite first or second range from the neutral position, thereby saving a clutch device for switching the propelling direction of the boat.

Figure 7:
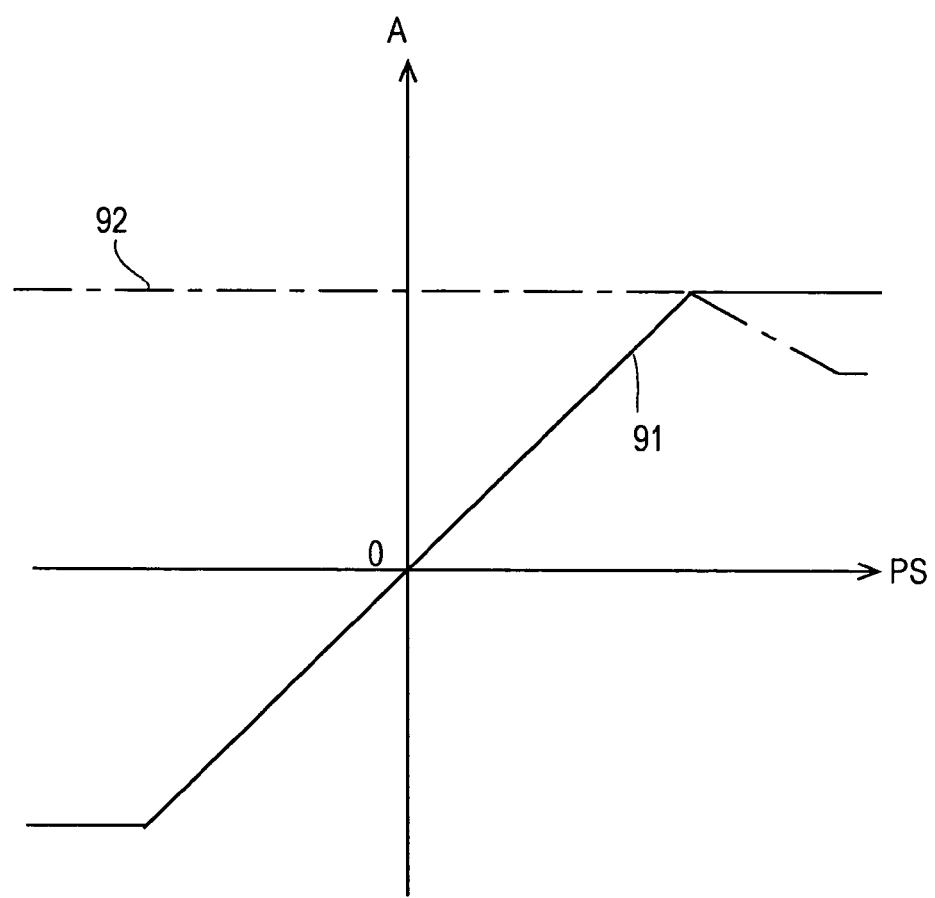
FIG. 7 is a graph of variation of angles of movable swash plates of hydraulic pump and motor in relation to the rotary speed of a propeller shaft when using the boat propulsion system according to the second embodiment.

A graph 91 in FIG. 7 expresses variation of angle A of swash plate 41f relative to rotary speed PS of propeller shaft 13. When movable swash plate 41f is set at the neutral position (the angle A of swash plate 41f is zero), hydraulic motor 42 with motor shaft 42a is stopped so as to stop propeller shaft 13. While the angle A of swash plate 41f in the first range (the positive range of the axis of ordinates in FIG. 7) is increased from zero to the limit angle, the rotary speed of hydraulic motor 42 driven by hydraulic pump 41 is increased so as to increase the rotary speed PS of propeller shaft 13 in the forward propelling direction (the positive range of the axis of abscissas in FIG. 7). While the angle A of swash plate 41f in the second range (the negative range of the axis of ordinates in FIG. 7) is increased from zero to the limit angle, the rotary speed of hydraulic motor 42 driven by hydraulic pump 41 is increased so as to increase the rotary speed PS of propeller shaft 13 in the backward propelling direction (the negative range of the axis of abscissas in FIG. 7).

In HST part 40', hydraulic motor 42 has a movable swash plate 42g as well as hydraulic pump 41 having movable swash plate 41f. A graph 92 in FIG. 7 expresses variation of angle A of swash plate 42g relative to rotary speed PS of propeller shaft 13. While movable swash plate 41f is shifted between its opposite limit angle positions, movable swash plate 42g is held at its larger limit angle position, thereby keeping the smallest displacement of hydraulic motor 42. After movable swash plate 41f reaches the limit angle position in the first range (for forward propelling), the angle A of movable swash plate 42g is reduced to the smaller limit angle so as to ensure increase of the rotary speed PS of propelling shaft 13, thereby enabling the boat to be propelled so fast.

What is claimed is:

1. A boat propulsion system interposed between a prime mover and a propeller shaft, comprising:
   a hydro-mechanical transmission including a hydrostatic transmission part and a gear transmission part,
   wherein the hydrostatic transmission part includes a variable displacement hydraulic pump having a movable swash plate and a hydraulic motor fluidly connected to the hydraulic pump, the hydraulic pump being driven by an output rotary force of the prime mover, and
   wherein the gear transmission part is drivingly interposed between the hydrostatic transmission part and the propeller shaft so that the gear transmission part is driven by an input rotary force of the hydraulic pump with the assistance of an output rotary force of the hydraulic motor.

2. The boat propulsion system as set forth in claim 1, further comprising:
   a reverser interposed between the gear transmission part of the hydro-mechanical transmission and the propeller shaft so as to select one of opposite output rotary directions of the propeller shaft.

3. The boat propulsion system as set forth in claim 1, wherein the gear transmission part includes a planetary gear which combines the input rotary force of the hydraulic pump and the output rotary force of the hydraulic motor, and transmits a resultant rotary force to the propeller shaft.

4. The boat propulsion system as set forth in claim 1, the swash plate of the hydraulic pump being movable into one of first and second opposite ranges from a neutral position, and the gear transmission part having a proper deceleration ratio established by stopping the hydraulic motor, wherein, if an output rotary speed of the prime mover is lower than a predetermined speed, the swash plate of the hydraulic pump is disposed in the first range to rotate the hydraulic motor so that a deceleration ratio of the hydro-mechanical transmission becomes larger than the proper deceleration ratio of the gear transmission part.

5. The boat propulsion system as set forth in claim 4, wherein the swash plate of the hydraulic pump in the first range is moved to reduce a displacement of the hydraulic pump as the output rotary speed of the prime mover is increased.

6. The boat propulsion system as set forth in claim 4, wherein, if the rotary speed of the prime mover is substantially equal to the predetermined speed, the swash plate of the hydraulic pump is set at the neutral position to stop the hydraulic motor so as to realize the proper deceleration ratio of the gear transmission part as a deceleration ratio of the hydro-mechanical transmission.

7. The boat propulsion system as set forth in claim 4, wherein, if the output rotary speed of the prime mover is higher than the predetermined speed, the swash plate of the hydraulic pump is disposed in the second range to rotate the hydraulic motor so that a deceleration ratio of the hydro-mechanical transmission becomes smaller than the proper deceleration ratio of the gear transmission part.

8. The boat propulsion system as set forth in claim 7, wherein the swash plate of the hydraulic pump in the second range is moved to increase a displacement of the hydraulic pump as the output rotary speed of the prime mover is increased.

9. A boat propulsion system interposed between a prime mover and a propeller shaft, comprising:
   a hydro-mechanical transmission including a hydrostatic transmission part and a gear transmission part,
   wherein the hydrostatic transmission part includes a variable displacement hydraulic pump having a movable swash plate and a hydraulic motor fluidly connected to the hydraulic pump and drivingly connected to the propeller shaft, and
   wherein the gear transmission part is drivingly interposed between the prime mover and the hydrostatic transmission part so that the gear transmission part is driven by an output rotary force of the prime mover so as to drive the hydraulic pump with the assistance of an output rotary force of the hydraulic motor.

10. The boat propulsion system as set forth in claim 9, wherein the gear transmission part includes a planetary gear which combines the output rotary force of the prime mover and the output rotary force of the hydraulic motor, and transmits a resultant force to the hydraulic pump.

11. The boat propulsion system as set forth in claim 10, the swash plate of the hydraulic pump being movable into one of first and second opposite ranges from a neutral position, wherein the swash plate of the hydraulic pump is set in the first range to rotate the propeller shaft for forward propelling, and wherein the swash plate of the hydraulic pump is set in the second range to rotate the propeller shaft for backward propelling.

12. The boat propulsion system as set forth in claim 11, wherein the hydraulic motor includes a movable swash plate which is moved to reduce a displacement of the hydraulic motor when the swash plate of the hydraulic pump reaches a limit position of either the first or second range away from the neutral position.

13. A boat propulsion system interposed between a prime mover and a propeller shaft, comprising:
   a planetary gearing mechanism having first, second and third elements; and
   a hydrostatic transmission having an input portion and an output portion,
   wherein the prime mover is drivingly connected to the first element,
   wherein the propeller shaft is drivingly connected to the second element, and
   wherein one of the input and output portions of the hydrostatic transmission is drivingly connected to the third element, and the other to either the first or second element.

* * * * *